US 8,059,672 B2

(12) United States Patent
Johnson et al.

(10) Patent No.: US 8,059,672 B2
(45) Date of Patent: Nov. 15, 2011

(54) INTERNET COMMUNICATIONS BETWEEN WIRELESS BASE STATIONS AND SERVICE NODES

(75) Inventors: Harold W. Johnson, Roach, MO (US); Timothy D. Euler, Shawnee Mission, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 1456 days.

(21) Appl. No.: 11/131,884

(22) Filed: May 18, 2005

(65) Prior Publication Data
US 2006/0262745 A1    Nov. 23, 2006

(51) Int. Cl.
*H04L 12/54* (2006.01)

(52) U.S. Cl. ........ 370/428; 455/445; 455/406; 455/466; 455/433; 455/456.6; 370/338; 370/352; 370/328; 370/331; 370/395.1; 370/404; 370/229; 370/202.1; 370/252

(58) Field of Classification Search .................. 455/326, 455/426.1, 435.1, 406, 432.1, 445, 466, 433, 455/452.2, 436, 456.6, 404.2, 415, 417, 404.1, 455/41.2, 421, 410, 456.1; 370/328, 331, 370/338, 352, 401, 335, 395.1, 404, 349, 370/253, 252, 229, 202.01, 329, 332; 44/456.3; 709/203, 223, 249; 445/326; 713/168, 182, 713/189, 102
See application file for complete search history.

(56) References Cited

U.S. PATENT DOCUMENTS

| | | | |
|---|---|---|---|
| 6,052,371 A * | 4/2000 | Lemieux | 370/338 |
| 6,205,143 B1 * | 3/2001 | Lemieux | 370/395.61 |
| 6,256,503 B1 * | 7/2001 | Stephens | 455/456.6 |
| 6,275,943 B1 * | 8/2001 | Pentikainen et al. | 726/4 |
| 6,359,871 B1 * | 3/2002 | Chung et al. | 370/338 |
| 6,708,031 B2 * | 3/2004 | Purnadi et al. | 455/436 |
| 6,747,986 B1 * | 6/2004 | Charas et al. | 370/465 |
| 6,853,894 B1 * | 2/2005 | Kolls | 701/29 |
| 6,894,994 B1 * | 5/2005 | Grob et al. | 370/335 |
| 6,999,435 B2 * | 2/2006 | Perras | 370/331 |
| 7,027,818 B2 * | 4/2006 | Bos et al. | 455/452.2 |
| 7,099,655 B2 * | 8/2006 | Song et al. | 455/411 |
| 7,133,513 B1 * | 11/2006 | Zhang | 379/202.01 |
| 7,146,153 B2 * | 12/2006 | Russell | 455/404.2 |

(Continued)

FOREIGN PATENT DOCUMENTS
EP        0987860        3/2000
(Continued)

OTHER PUBLICATIONS

European Patent Office, "Communication under Rule 71(3) EPC," Dec. 18, 2009, 25 pages, European Patent Office, Munich, Germany.

*Primary Examiner* — Dwayne Bost
*Assistant Examiner* — Joseph Arevalo

(57) ABSTRACT

A communication system includes a base station and a service node. The service node communicates over the Internet. The base station establishes Internet connectivity over a communication link. The base station registers with the service node over the communication link and the Internet, and the service node validates the base station during registration. The base station and service node establish a tunnel over the communication link and the Internet. The base station exchanges user communications with wireless communication devices in a wireless format. The base station and service node exchange the user communications over the tunnel. The service node processes the user communications to provide a communication service to the wireless communication devices.

28 Claims, 4 Drawing Sheets

U.S. PATENT DOCUMENTS

| | | | |
|---|---|---|---|
| 7,146,453 B2 * | 12/2006 | Shyam et al. | 711/4 |
| 7,152,160 B2 * | 12/2006 | Lantto et al. | 713/168 |
| 7,187,923 B2 * | 3/2007 | Mousseau et al. | 455/416 |
| 7,420,951 B1 * | 9/2008 | Mizell et al. | 370/338 |
| 7,545,868 B2 * | 6/2009 | Kennedy et al. | 375/259 |
| 7,586,876 B2 * | 9/2009 | Chung et al. | 370/331 |
| 7,668,139 B2 * | 2/2010 | Mitchel et al. | 370/331 |
| 7,733,904 B1 * | 6/2010 | Borella et al. | 370/467 |
| 7,738,871 B2 * | 6/2010 | Olvera-Hernandez et al. | 455/436 |
| 2001/0044305 A1 | 11/2001 | Reddy et al. | |
| 2003/0211843 A1 * | 11/2003 | Song et al. | 455/411 |
| 2004/0048601 A1 * | 3/2004 | Lee et al. | 455/410 |
| 2004/0097232 A1 * | 5/2004 | Haverinen | 455/436 |
| 2004/0120283 A1 * | 6/2004 | Rezaiifar et al. | 370/328 |
| 2004/0139044 A1 | 7/2004 | Rehwald | |
| 2004/0221042 A1 * | 11/2004 | Meier | 709/227 |
| 2004/0236965 A1 * | 11/2004 | Krohn | 713/201 |
| 2005/0070283 A1 | 3/2005 | Hashimoto et al. | |
| 2005/0089052 A1 * | 4/2005 | Chen et al. | 370/401 |
| 2006/0023645 A1 * | 2/2006 | Hench | 370/276 |
| 2006/0045049 A1 * | 3/2006 | Chung et al. | 370/331 |
| 2006/0104313 A1 * | 5/2006 | Haner et al. | 370/517 |
| 2006/0187900 A1 * | 8/2006 | Akbar | 370/352 |
| 2006/0215607 A1 * | 9/2006 | Mitchel et al. | 370/331 |
| 2008/0108319 A1 * | 5/2008 | Gallagher | 455/404.2 |
| 2009/0190549 A1 * | 7/2009 | Kim et al. | 370/331 |
| 2010/0246532 A1 * | 9/2010 | Olvera-Hernandez et al. | 370/331 |

FOREIGN PATENT DOCUMENTS

| | | |
|---|---|---|
| EP | 0917320 | 2/2007 |
| JP | 2002152312 | 5/2002 |
| JP | 2003249944 | 9/2003 |
| JP | 2004135261 | 4/2004 |
| JP | 2005109570 | 4/2005 |
| WO | WO 00/28714 | 5/2000 |
| WO | WO 03/081552 | 10/2003 |

* cited by examiner

INTERNET COMMUNICATIONS BETWEEN WIRELESS BASE STATIONS AND SERVICE NODES

RELATED APPLICATIONS

Not applicable

FEDERALLY SPONSORED RESEARCH OR DEVELOPMENT

Not applicable

MICROFICHE APPENDIX

Not applicable

BACKGROUND OF THE INVENTION

1. Field of the Invention

The invention is related to the field of communications, and in particular, to the use of the Internet for communications between wireless base stations and service nodes, such as mobile switching centers.

2. Description of the Prior Art

For wireless communications, end-users operate wireless communication devices that exchange user communications in a wireless communication format with a base station. The base station then exchanges the user communications in a non-wireless format with a service node, such as a mobile switching center. The service node processes the user communications to provide a communication service, such as telephony or Internet access.

Unfortunately, Time Division Multiplex (TDM) links, such as DS1 or DS3 links, are typically used to exchange the user communications between the base station and the service node. DS1 and DS3 links are relatively expensive. Not only are these TDM links expensive, but they can take too much time to establish. In a given area, there may not be a robust set of competing service providers that provide DS3 or DS1 links, which usually results in poor service. In addition, these TDM links may not even be available in some areas.

The demand for wireless communications is growing with respect to coverage and capacity. Newer data applications, such as web browsing and music downloads, have become popular features for wireless communications devices. The newer data applications typically have an asymmetrical traffic pattern where more bandwidth is used from the service node to the base station than from the base station to the service node. For example, an end-user request to download a song typically uses far less bandwidth than the bandwidth used to actually download the song to the end-user.

Internet access has become relatively low-cost and ubiquitous. Many service providers compete to provide low-cost Internet access to numerous and wide-ranging service areas. Examples of internet access technologies include asymmetrical digital subscriber line, DOCSIS, IEEE 802.11, IEEE 802.16, and broadband over power line.

Unfortunately, this low-cost and ubiquitous Internet access has not been effectively implemented to exchange user communications between base stations and service nodes.

SUMMARY OF THE INVENTION

Examples of the invention include a communication system comprising a base station and a service node. The service node is configured to communicate over the Internet. The base station is configured to establish Internet connectivity over a communication link to the Internet and register with the service node over the communication link and the Internet. The base station is configured to establish a tunnel with the service node over the communication link and the Internet. The base station is configured to exchange user communications with wireless communication devices in a wireless format. The base station is configured to exchange the user communications with the service node over the tunnel. The service node is configured to validate the base station during registration. The service node is configured to establish the tunnel with the base station over the communication link and the Internet. The service node is configured to exchange the user communications with the base station over the tunnel. The service node is configured to process the user communications to provide a communication service to the wireless communication devices.

In some examples of the invention, the communication link is asymmetrical to provide more bandwidth from the service node to the base station than from the base station to the service node.

In some examples of the invention, the communication link comprises an Asymmetrical Digital Subscriber Line (ADSL) link, DOCSIS link, 802.11 link, 802.16 link, or Broadband over Power Line (BPL) link.

In some examples of the invention, the base station is omni-directional and has no sectors.

In some examples of the invention, the base station has a maximum capacity of 20 simultaneous wireless communication devices.

In some examples of the invention, the base station has a maximum of three RF receive channels and three RF transmit channels.

In some examples of the invention, the base station is configured to establish the Internet connectivity by logging-in to an Internet service provider.

In some examples of the invention, the base station is configured to establish the Internet connectivity, register with the service node, and establish the tunnel based on a predetermined schedule, and to de-establish the Internet connectivity, de-register with the service node, and de-establish the tunnel based on the predetermined schedule.

In some examples of the invention, the base station is configured to establish the Internet connectivity, register with the service node, and establish the tunnel in response to end-user activity, and to de-establish the Internet connectivity, de-register with the service node, and de-establish the tunnel based on a lack of the end-user activity.

In some examples of the invention, the base station is portable.

In some examples of the invention, the service node comprises a mobile switching center.

Examples of the invention include a method of operating a communication system. The method comprises: establishing Internet connectivity between a base station and the Internet over a communication link, wherein a service node is configured to communicate over the Internet; registering the base station with the service node over the communication link and the Internet to validate the base station; establishing a tunnel between the base station and the service node over the communication link and the Internet; exchanging user communications between the base station and wireless communication devices in a wireless format; exchanging the user communications between the base station and the service node over the tunnel; and processing the user communications in the service node to provide a communication service to the wireless communication devices.

BRIEF DESCRIPTION OF THE DRAWINGS

The same reference number represents the same element on all drawings.

DETAILED DESCRIPTION OF THE PREFERRED EMBODIMENT

The following description and associated figures depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Example #1

Figure 1:
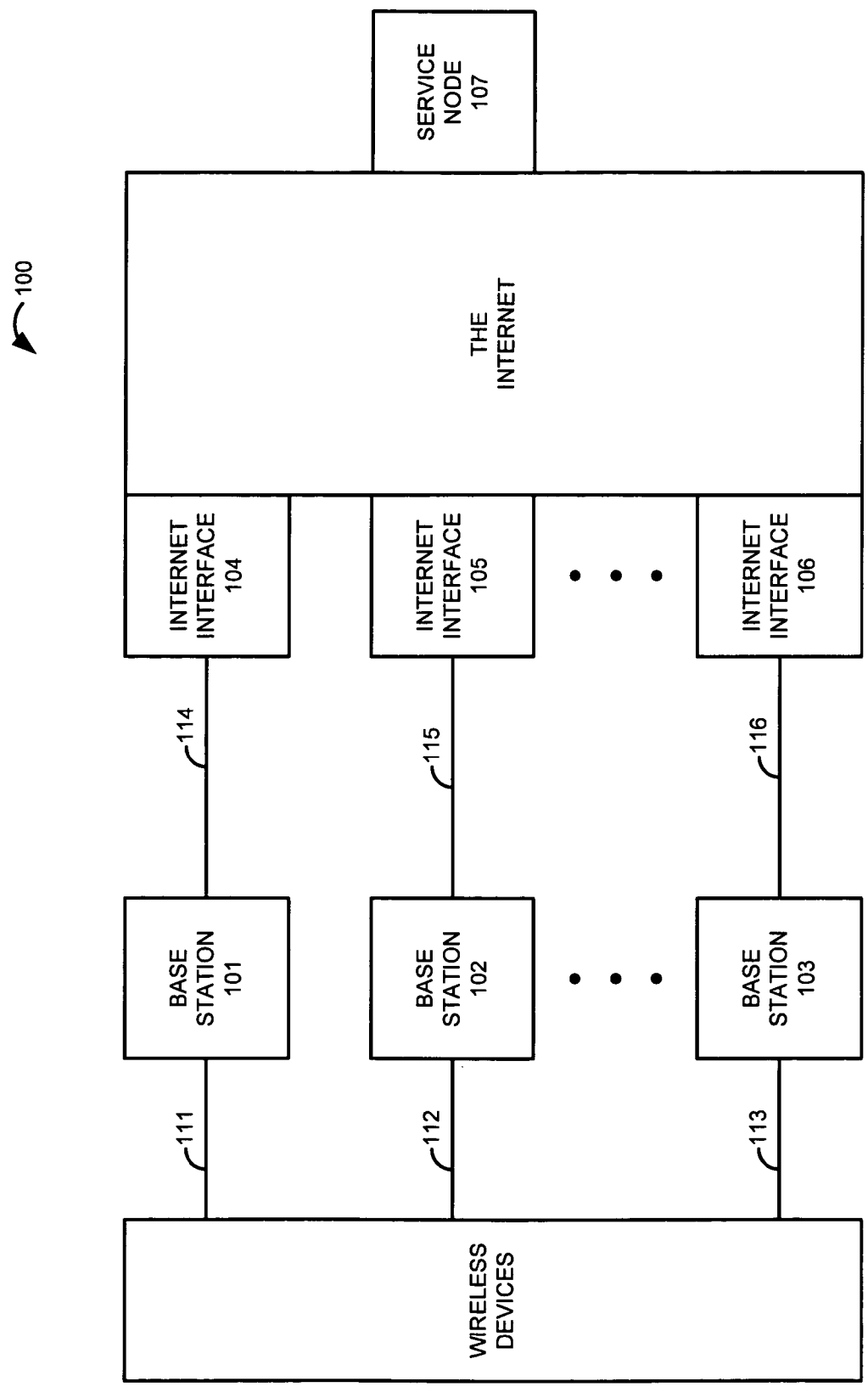
FIG. 1 illustrates communication system 100 in an example of the invention.

FIG. 1 illustrates communication system 100 in an example of the invention. Communication system 100 includes base stations 101-103, Internet interfaces 104-106, and service node 107. Base station 101 establishes Internet connectivity over communication link 114 to Internet interface 104. In some variations, Internet interface 104 represents an Internet Service Provider (ISP), and base station 101 establishes the Internet connectivity by logging-on to the ISP over communication link 114. Internet interface 104 and service node 107 are configured to communicate over the Internet. Thus, base station 101 and service node 107 can communicate with one another over communication link 114 and the Internet.

In some variations, communication link 114 is asymmetrical to provide more bandwidth from service node 107 to base station 101 than from base station 101 to service node 107. An asymmetric communication link is especially suitable for data applications, such as Internet browsing or music downloads, where there is more traffic from service node 107 to base station 101 than from base station 101 to service node 107. Communication link 114 could be an Asymmetrical Digital Subscriber Line (ADSL) link, DOCSIS link, 802.11 link (Wi-Fi), 802.16 link (Wi-Max), Broadband over Power Line (BPL) link, or some other form of Internet access link.

Base station 101 registers with service node 107 over communication link 114 and the Internet. During registration, service node 107 validates base station 101. Validation includes establishing that the entity attempting to register is who they say they are, and that that entity is entitled to register. In some variations, base station 101 and service node 107 are each be programmed with a secret user name and access code for base station 101. Service node 107 validates base station 101 by obtaining the user name and secret access code from base station 101 during registration, and then checking the user name and secret access code in a validation database to ensure that the user name and secret access code are associated with base station 101, and that base station 101 is entitled to register. Service node 107 will deny service to base station 101 if validation fails.

Base station 101 and service node 107 establish a communication tunnel between one another over communication link 114 and the Internet. Typically, the tunnel would be a secure Internet Protocol (IP) tunnel. The security could be provided through encryption or some other means. Base station 101 and service node 107 could include conventional Internet utilities, such as Internet ports, firewalls, and Internet access software.

Base station 101 includes an antenna and exchanges user communications in a wireless format with wireless communication devices over wireless links 111. The wireless format could be Code Division Multiple Access (CDMA), Global System for Mobile communications (GSM), IEEE 802.11 (Wi-Fi), IEEE 802.16 (Wi-Max), free-space laser, E-Band, or some other wireless communication format. Base station 101 exchanges the user communications with service node 107 over the tunnel. Service node 107 processes the user communications to provide a communication service to the wireless communication devices. Examples of communication services include telephony, instant messaging, push-to-talk, Internet access, video downloads, and audio downloads, although there could be alternative communication services. In some variations, service node 107 comprises a mobile switching center.

In some variations, base station 101 and service node 107 may not maintain permanent Internet connectivity, registration, and/or tunneling. Base station 101 and/or service node 107 could establish and de-establish the Internet connectivity based on a predetermined schedule. For example, base station 101 could establish the Internet connectivity on Monday morning at 7:00 and de-establish the Internet connectivity on Friday evening at 6:00. Numerous and more complex schedules could be used. Likewise, base station 101 and/or service node 107 could register and de-register base station 101 based on a predetermined schedule. Base station 101 and/or service node 107 could establish and de-establish the tunnel based on a predetermined schedule. These predetermined schedules for Internet connectivity, registration, and tunneling could the same or different. In some variations, base station 101 and/or service node 107 could establish the Internet connectivity, register with the service node, and establish the tunnel based on a predetermined schedule, and then de-establish the Internet connectivity, de-register with the service node, and de-establish the tunnel based on the predetermined schedule. Thus, based on a predetermined schedule, base station 101 and service node 107 can transition between a disconnected state where they have no interaction with one another, and a connected state where they interact to deliver the communication service to the wireless communication devices.

In some variations, base station 101 could establish and de-establish the Internet connectivity based on end-user activity. For example, base station could establish the Internet connectivity in response to a service request from one of the wireless communication devices and de-establish the Internet connectivity after a time period elapses with a lack of other service requests from the wireless communication devices. Numerous and more complex end-user activity-based control schemes could be used. Likewise, base station 101 could register and de-register with service node 107 based on end-user activity, or base station 101 could establish and de-establish the tunnel based on end-user activity. These end-user activity-based control schemes for Internet connectivity, registration, and tunneling could the same or different. In some variations, base station 101 could establish the Internet connectivity, register with service node 107, and establish the tunnel based on an end-user activity control scheme, and then de-establish the Internet connectivity, de-register with service node 107, and de-establish the tunnel based on the same end-user activity control scheme. Thus, based on end-user activity, base station 101 and service node 107 can transition between a disconnected state where they have no interaction with one another, and a connected state where they interact to deliver the communication service to the wireless communication devices. Other techniques to detect end-user activity could be used, such as motion detectors, human proximity detectors, or even a simple on-off switch that the end-users may control manually.

A remote control system could transfer control messages to base station 101 and service node 107 to direct these systems to establish and de-establish Internet connectivity, registration, and tunneling. The remote control could be based on a predetermined schedule, expected end-user activity, or some other factor.

In some variations, base station 101 is relatively small, which allows for a relatively small bandwidth load on communication link 114. Base station 101 may be omni-directional meaning the base station has no sectors. Base station 101 may have a maximum capacity of 20 simultaneous wireless communication devices. Base station 101 may have a maximum of three Radio Frequency (RF) receive channels and three RF transmit channels.

Base stations 102 and 103 could be configured and operate as described for base station 101. Base station 102 could exchange user communications with wireless communication devices over wireless communication links 112 and exchange the user communications with service node 107 through a tunnel over communication link 115 and the Internet. Likewise, base station 103 could exchange user communications with wireless communication devices over wireless communication links 113 and exchange the user communications with service node 107 through a tunnel over communication link 116 and the Internet.

Note that service node 107 is capable of interacting with multiple base stations as described above. Service node can register, validate, and establish tunnels to multiple base stations. Service node 107 may do so based on differing schedules, end-user activity, or remote control. Thus, service node 107 can support a dynamically changing mix of base stations.

Example #2

Figure 2:
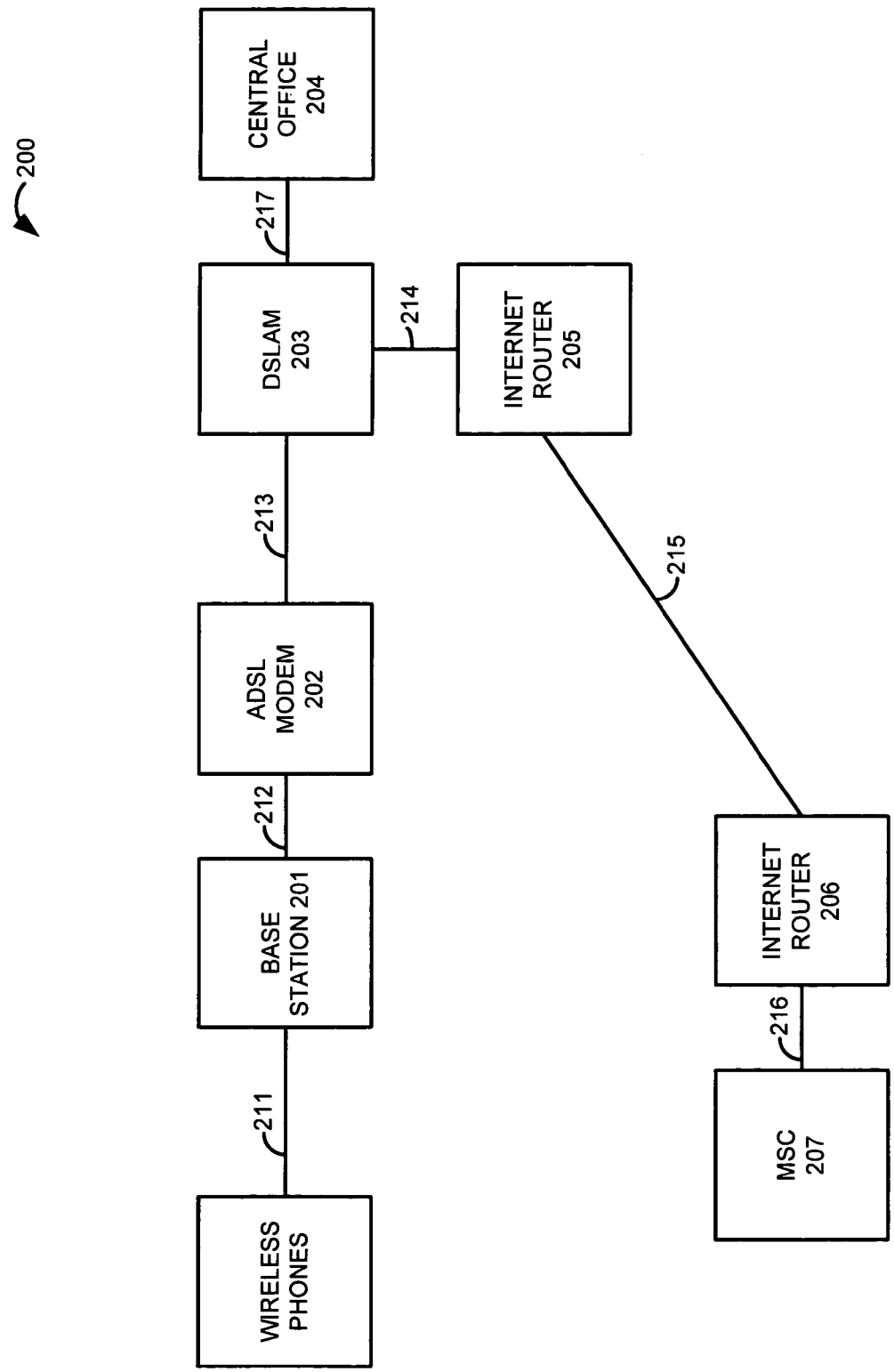
FIG. 2 illustrates communication system 200 in an example of the invention.

FIG. 2 illustrates communication system 200 in an example of the invention. Communication system 200 includes base station 201, ADSL modem 202, Digital Subscriber Line Access Multiplexer (DSLAM) 203, central office 204, Internet routers 205-206, and Mobile Switching Center (MSC) 207. Base station 201 is coupled to ADSL modem 202 by communication link 212. ADSL modem 202 is coupled to DSLAM 203 by ADSL link 213. DSLAM 203 is coupled to Internet router 205 by IP link 214 and to central office 204 by Time Division Multiplex (TDM) link 217. Internet router 205 is coupled to Internet router 206 over IP link 215. Internet router 206 is coupled to MSC 207 by IP link 216. Communication links 211-217 could be conventional.

Base station 201 establishes Internet connectivity to MSC 207 over a communication link (comprised of links 212-213, modem 202, and DSLAM 216) and the Internet (comprised of Internet routers 205-206 and links 214-216). In some variations, Internet router 205 represents an ISP, and base station 201 establishes the Internet connectivity by logging-on to the ISP. MSC 207 and DSLAM 203 are configured to communicate over the Internet. Thus, base station 201 and MSC 207 can communicate with one another over the above described communication link and the Internet.

Base station 201 registers with MSC 207 over the communication link and the Internet. During registration, MSC 207 validates base station 201 by establishing that base station 201 is actually the entity attempting to register, and that base station 201 is entitled to register. MSC 207 will deny service to base station 201 if validation fails.

Base station 201 and MSC 207 establish a communication tunnel between one another over the communication link and the Internet. Typically, the tunnel would be a secure IP tunnel. The security could be provided through encryption or some other means. Base station 201 and MSC 207 could include conventional Internet utilities, such as Internet ports, firewalls, and Internet access software.

Base station 201 exchanges user communications in a wireless format with the wireless phones over wireless links 211. The wireless format could be CDMA, GSM, Wi-Fi, Wi-Max, free-space laser, or some other wireless communication format. Base station 201 exchanges the user communications with MSC 207 over the tunnel. MSC 207 processes the user communications to provide a communication service to the wireless phones. Examples of communication services include telephony, instant messaging, push-to-talk, Internet access, video downloads, and audio downloads, although there could be alternative communication services.

In some variations, base station 201 may not maintain permanent Internet connectivity, registration, and/or tunneling with MSC 207. Base station 201 and/or MSC 207 could establish and de-establish the Internet connectivity based on a predetermined schedule. Likewise, base station 201 and/or MSC 207 could register and de-register base station 201 based on a predetermined schedule. Base station 201 and/or MSC 207 could establish and de-establish the tunnel based on a predetermined schedule. These predetermined schedules for Internet connectivity, registration, and tunneling could be the same or different. In some variations, base station 201 and/or MSC 207 could establish the Internet connectivity, register, and establish the tunnel based on a predetermined schedule, and then de-establish the Internet connectivity, de-register, and de-establish the tunnel based on the predetermined schedule. Thus, based on a predetermined schedule, base station 201 and MSC 207 can transition between a disconnected state where they have no interaction with one another, and a connected state where they interact to deliver the communication service to the wireless phones.

In some variations, base station 201 could establish and de-establish the Internet connectivity based on end-user activity. Likewise, base station 201 could register and de-register with MSC 207 based on end-user activity, or base station 201 could establish and de-establish the tunnel based on end-user activity. These end-user activity-based control schemes for Internet connectivity, registration, and tunneling could the same or different. In some variations, base station 101 could establish the Internet connectivity, register with MSC 207, and establish the tunnel based on an end-user activity control scheme, and then de-establish the Internet connectivity, de-register with the service node, and de-establish the tunnel based on the same end-user activity control scheme. Based on end-user activity, base station 201 and MSC 207 can transition between a disconnected state where they have no interaction with one another, and a connected state where they interact to deliver the communication service to the wireless phones. Other techniques to detect end-user activity could be used, such as motion detectors, human proximity detectors, or even a simple on-off switch that the end-user may control manually.

A remote control system could transfer control messages to base station 201 and MSC 207 to direct these systems to establish and de-establish Internet connectivity, registration, and tunneling. The remote control could be based on a pre-determined schedule, expected end-user activity, or some other factor.

MSC 207 is capable of interacting with multiple additional base stations (not shown) in a similar manner. Thus, MSC 207 can register, validate, and establish tunnels to multiple base stations. MSC 207 may do so based on differing schedules, end-user activity, or remote control. Thus, MSC 207 can support a dynamically changing mix of base stations.

In some variations, base station 201 is relatively small, which allows for a relatively small bandwidth load on ADSL link 213. Base station 201 may be omni-directional meaning the base station has no sectors. Base station 201 may have a maximum capacity of 20 simultaneous wireless communication devices. Base station 201 may have a maximum of three Radio Frequency (RF) receive channels and three RF transmit channels.

Example #3

Figure 3:
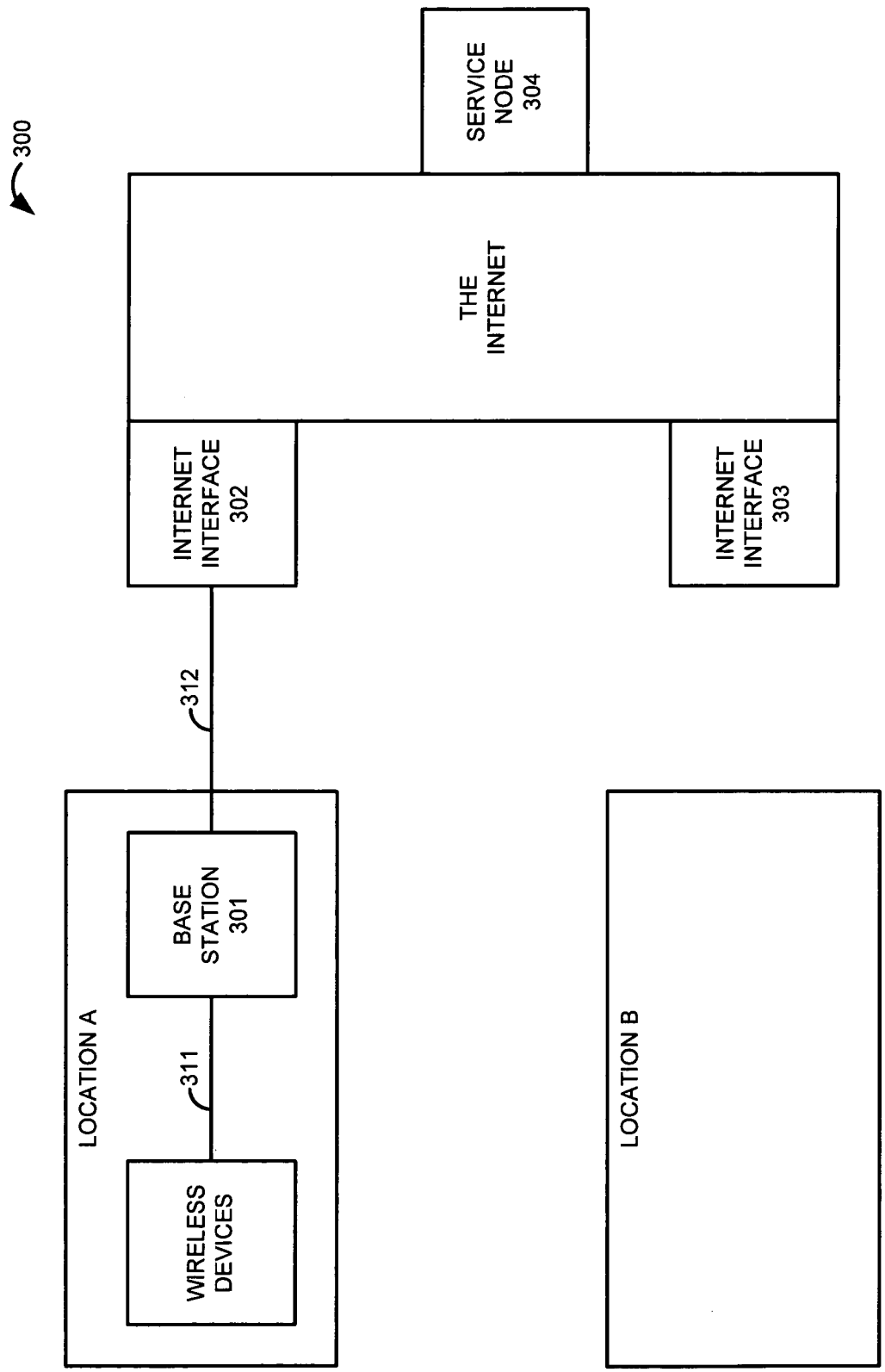
FIG. 3 illustrates communication system 300 in an example of the invention.
Figure 4:
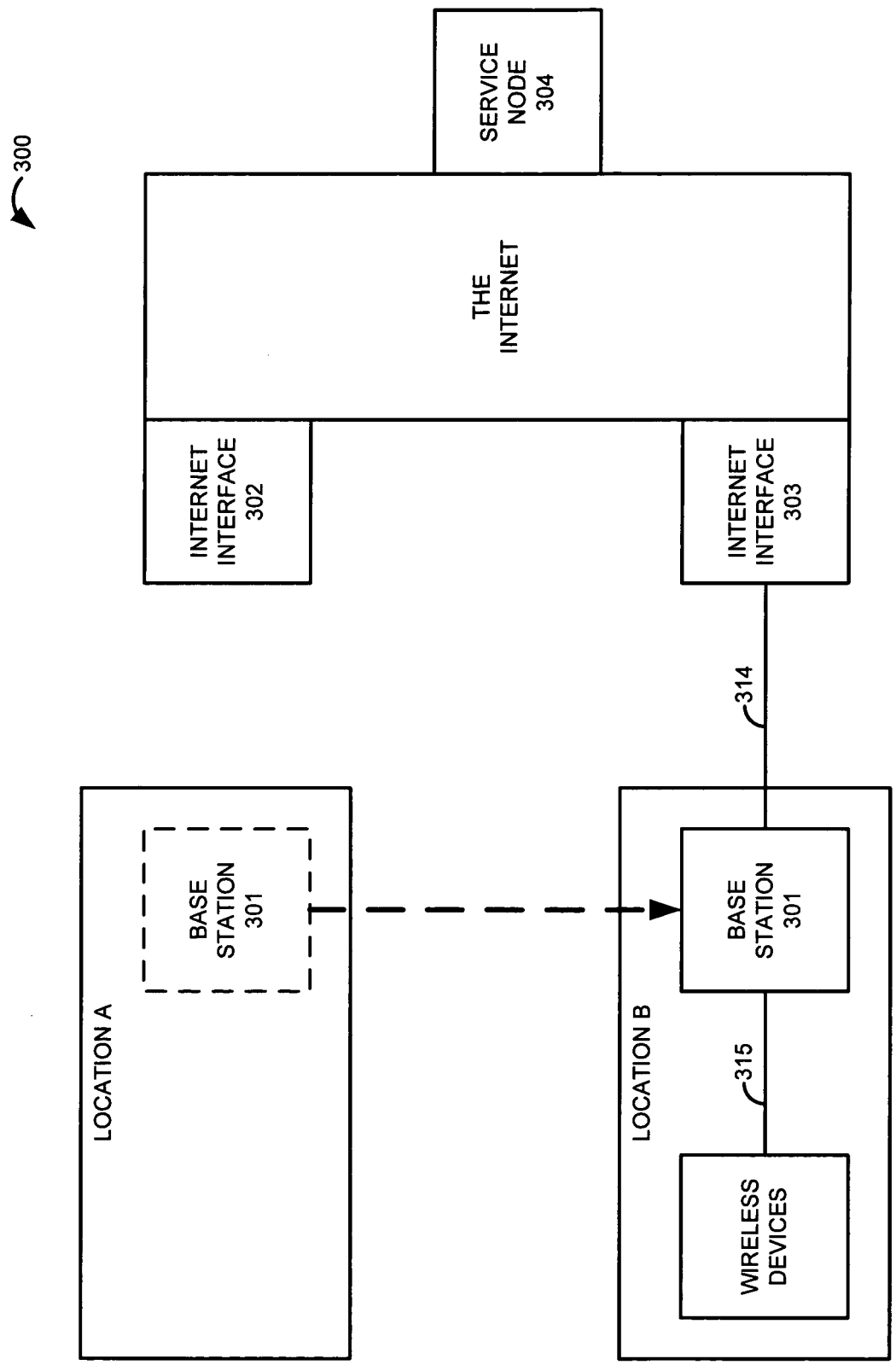
FIG. 4 illustrates communication system 300 in an example of the invention.

FIGS. 3-4 illustrate communication system 300 in an example of the invention. Communication system 300 includes base station 301, Internet interfaces 302-303, and service node 304. Internet interfaces 302-303 and service node 304 communicates over the Internet. At location "A", base station 301 establishes Internet connectivity with Internet interface 302 over communication link 312. Base station 301 registers with service node 304 over communication link 312 and the Internet. During registration, service node 304 validates base station 301. Base station 301 and service node 304 establish a communication tunnel between one another over communication link 312 and the Internet. Base station 301 exchanges user communications in a wireless format with wireless communication devices over wireless links 311. Base station 301 and service node 304 exchange the user communications over the tunnel. Service node 304 processes the user communications to provide a communication service to the wireless communication devices. In some variations, service node 304 comprises an MSC.

Referring to FIG. 4, base station has been moved from location "A" to location "B" as indicated by the dashed lines. At location "B", base station 301 establishes Internet connectivity with Internet interface 303 over communication link 314. Base station 301 re-registers with service node 304 over communication link 314 and the Internet. During registration, service node 304 re-validates base station 301. Base station 301 and service node 304 establish a new communication tunnel between one another over communication link 314 and the Internet. Base station 301 exchanges user communications in a wireless format with wireless communication devices over wireless links 313. Base station 301 and service node 304 exchange the user communications over the new tunnel. Service node 304 processes the user communications to provide a communication service to the wireless communication devices. Note that the variations and features described above for Examples #1 and #2 may also apply to Example #3.

Base station 301 could be moved multiple times as needed. At each new location, base station 301 would establish new Internet connectivity, re-register with service node 304, and establish a new tunnel to service node 304. Thus, base station 301 could be moved to an area where wireless communication services are temporarily required, and when that demand goes away, base station 301 could be moved to a new area with a new demand for wireless communication services.

For example, base station 301 may be moved to an NFL football stadium on Sunday morning to provide added wireless communications capacity or coverage during the football game that day. On Monday, base station 301 could be moved to a convention center to provide added wireless communications capacity or coverage during a conference that week.

To facilitate such movement, base station 301 may be relatively small, and should be configured in a portable package. In the context of the invention, portable means that a person may physically carry the base station from one location to another, and readily connect and disconnect the power, communication, and control links.

Advantages

Communication systems 100-300 provide the following advantages (although all examples of the invention may not provide these advantages). The problematic cost and delay of using DS1 or DS3 connections to communicate between base stations and service nodes is avoided by using Internet access technologies and the Internet. Internet access and connectivity is lower in cost and more ubiquitous than DS1 or DS3 connections.

The lower cost and ubiquity of Internet access allows base stations to be placed in more areas to serve increasing demand. In addition, portable base stations may be quickly deployed and moved about to serve areas that require additional capacity or coverage for a temporary amount of time.

The invention claimed is:

1. A communication system comprising:
a service node comprising a mobile switching center, wherein the service node is configured to communicate over the Internet; a base station configured to establish Internet connectivity over a communication link to the Internet, register with the service node over the communication link and the Internet, establish a tunnel with the service node over the communication link and the Internet, exchange user communications with wireless communication devices in a wireless format, and exchange the user communications with the service node over the tunnel; and wherein
the service node is configured to validate the base station during registration, establish the tunnel with the base station over the communication link and the Internet, exchange the user communications with the base station over the tunnel, and process the user communications to provide a communication service to the wireless communication devices.

2. The communication system of claim 1 wherein the communication link is asymmetrical to provide more bandwidth from the service node to the base station than from the base station to the service node.

3. The communication system of claim 1 wherein the communication link comprises an Asymmetrical Digital Subscriber Line (ADSL) link.

4. The communication system of claim 1 wherein the communication link comprises a DOCSIS link.

5. The communication system of claim 1 wherein the communication link comprises an 802.11 link.

6. The communication system of claim 1 wherein the communication link comprises an 802.16 link.

7. The communication system of claim 1 wherein the communication link comprises a Broadband over Power Line (BPL) link.

8. The communication system of claim 1 wherein the base station is omni-directional and has no sectors.

9. The communication system of claim 1 wherein the base station has a maximum capacity of 20 simultaneous wireless communication devices.

10. The communication system of claim 1 wherein the base station has a maximum of three RF receive channels and three RF transmit channels.

11. The communication system of claim 1 wherein the base station is configured to establish the Internet connectivity by logging-in to an Internet service provider.

12. The communication system of claim 1 wherein the base station is configured to establish the Internet connectivity, register with the service node, and establish the tunnel based on a predetermined schedule, and to de-establish the Internet connectivity, de-register with the service node, and de-establish the tunnel based on the predetermined schedule.

13. The communication system of claim 1 wherein the base station is configured to establish the Internet connectivity, register with the service node, and establish the tunnel in response to end-user activity, and to de-establish the Internet connectivity, de-register with the service node, and de-establish the tunnel based on a lack of the end-user activity.

14. The communication system of claim 1 wherein the base station is portable.

15. A method of operating a communication system, the method comprising:
    establishing Internet connectivity between a base station and the Internet over a communication link, wherein a service node comprising a mobile switching center is configured to communicate over the Internet;
    registering the base station with the service node over the communication link and the Internet to validate the base station;
    establishing a tunnel between the base station and the service node over the communication link and the Internet;
    exchanging user communications between the base station and wireless communication devices in a wireless format;
    exchanging the user communications between the base station and the service node over the tunnel; and
    processing the user communications in the service node to provide a communication service to the wireless communication devices.

16. The method of claim 15 wherein the communication link is asymmetrical to provide more bandwidth from the service node to the base station than from the base station to the service node.

17. The method of claim 15 wherein the communication link comprises an Asymmetrical Digital Subscriber Line (ADSL) link.

18. The method of claim 15 wherein the communication link comprises a DOCSIS link.

19. The method of claim 15 wherein the communication link comprises an 802.11 link.

20. The method of claim 15 wherein the communication link comprises an 802.16 link.

21. The method of claim 15 wherein the communication link comprises a Broadband over Power Line (BPL) link.

22. The method of claim 15 wherein the base station is omni-directional and has no sectors.

23. The method of claim 15 wherein the base station has a maximum capacity of 20 simultaneous wireless communication devices.

24. The method of claim 15 wherein the base station has a maximum of three RF receive channels and three RF transmit channels.

25. The method of claim 15 wherein establishing the Internet connectivity comprises logging-in to an Internet service provider.

26. The method of claim 15 wherein establishing the Internet connectivity, registering with the service node, and establishing the tunnel comprises doing so based on a predetermined schedule, and wherein de-establishing the Internet connectivity, de-registering with the service node, and de-establishing the tunnel comprises doing so based on the predetermined schedule.

27. The method of claim 15 wherein establishing the Internet connectivity, registering with the service node, and establishing the tunnel comprises doing so in response to end-user activity, and de-establishing the Internet connectivity, de-registering with the service node, and de-establishing the tunnel comprises doing so based on a lack of the end-user activity.

28. The method of claim 15 wherein the base station is portable.

* * * * *